No. 719,537.  
PATENTED FEB. 3, 1903.  
W. WAHLBERG.  
VAPOR BURNER.  
APPLICATION FILED MAY 24, 1902.  
NO MODEL.
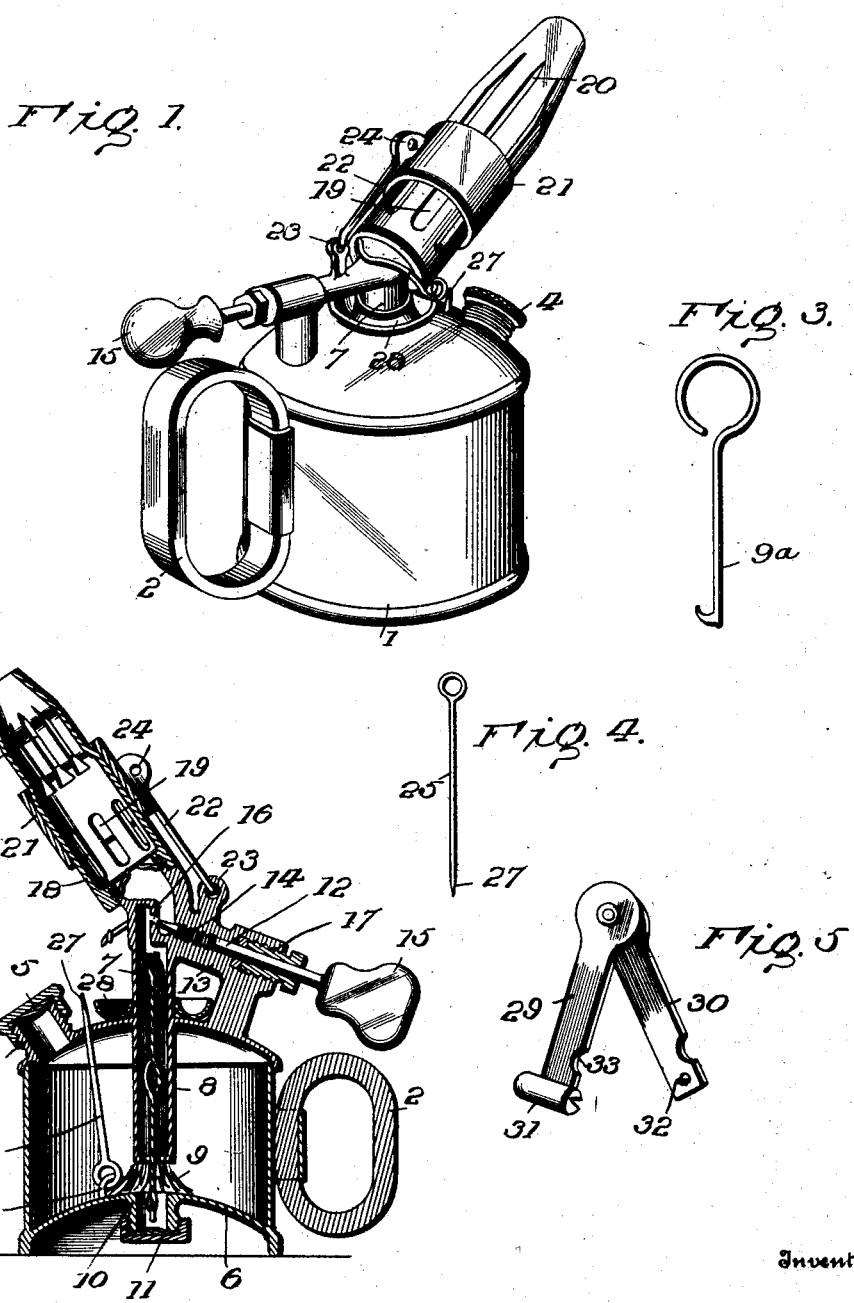
Inventor  
William Wahlberg,

UNITED STATES PATENT OFFICE.

WILHELM WAHLBERG, OF CHICAGO, ILLINOIS.

VAPOR-BURNER.

SPECIFICATION forming part of Letters Patent No. 719,537, dated February 3, 1903.

Application filed May 24, 1902. Serial No. 108,827. (No model.)

*To all whom it may concern:*

Be it known that I, WILHELM WAHLBERG, a citizen of the United States, residing at Chicago, in the county of Cook and State of Illinois, have invented certain new and useful Improvements in Vapor-Burners; and I do hereby declare the following to be a full, clear, and exact description of the invention, such as will enable others skilled in the art to which it appertains to make and use the same.

My invention relates to portable lamps, and while especially desirable and efficient when so applied to use will also be found desirable upon other forms of lamps; and my invention consists of certain novel features of combination and construction of parts, the preferred form whereof will be hereinafter clearly set forth, reference being had to the accompanying drawings, made a part of this application.

The object of my invention is to provide simple, cheap, and efficient mechanism which will insure that a flame having a maximum degree of heat may be generated from parts of minimum size.

A further object is to provide coöperating devices which will be absolutely safe under all circumstances.

A further object of my invention is to provide automatic means for the escape of a superabundance of gas should more than the desired quantity be generated within the oil-reservoir.

A still further object is to provide simple and effective devices for instantly cutting off the gaseous fuel from the flame, and thereby extinguishing the same when not required for use.

A further object of my invention is to insure that the requisite degree of pressure will be automatically provided.

Other objects and advantages will be hereinafter made clearly apparent, considered in connection with the accompanying drawings, in which—

Figure 1 is a perspective view of my invention complete ready for use. Fig. 2 is a central vertical section of Fig. 1, showing the interior parts, as well as exterior outlines of said parts. Figs. 3, 4, and 5 are devices designed as being very useful adjuncts to the lamp, whereby the parts thereof may be readily controlled.

In order to conveniently designate the various details of my invention and accessories required to illustrate a practical application thereof to use, numerals will be employed, the same numeral referring to a similar part throughout the several views.

Referring to the numerals on the drawings, 1 indicates the receptacle proper, which may be of any preferred shape and size and formed of any desired material and is preferably provided with a suitable handle 2, secured to the body portion in any preferred way. The said reservoir or body portion 1 is also provided with the tubular orifice 3, having the closure or cap 4 threaded thereon, said cap carrying a suitable washer 5, of leather or the like, in order that the gases within may be reliably confined.

I desire to call special attention to the bottom of my receptacle, as indicated by the numeral 6, said bottom being formed of some flexible material which will act as a movable diaphragm and move slightly upward and downward in response to the pressure from the gas within the receptacle. I also form, preferably integral with the top of the receptacle, the upwardly-extending gas-delivering throat 7, which continues downward within the receptacle, as indicated by the numeral 8, and is tubular throughout and designed to provide a seat for the wick 9, the object of which is to freely permit the passage of the gas, though checking the outward flow of the liquid contents of the receptacle, as will be obvious.

In order that the wick 9 may be quickly and easily introduced into its operative position within the tubular chamber 8, I provide the centrally-disposed orifice 10, formed in the central part of the bottom 6 and having a threaded cap or closure 11, as clearly shown in Fig. 2. In order that the outward flow of the gas may be placed under the reliable control of the operator, I provide the needle-valve 12, which is properly threaded and rotatably seated within the seat 13, as indicated by the numeral 14, said valve being provided with a controlling-handle 15, whereby the valve may be easily rotated in either direction, and thereby instantly cut off the flow of the gas through the aperture 16. The escape of the gas around the needle-valve 12 is prevented in any preferred way, as by the stuffing-box 17, common to this form of lamp construction.

It will be observed that I have also integrally formed with the tubular throat 7 and contiguous parts the flame-directing nozzle 18, having a plurality of radially-disposed slotted apertures 19 near its inner end and a plurality of similar openings 20 near its outer end, the object of said openings being to introduce the required quantity of air to be commingled with the gas from the lamp before combustion has taken place, and in order that the size of the openings 19 may be varied as desired I provide the loosely-fitting collar 21, designed to coöperate with the nozzle 18.

It will be understood that the collar 21 may be secured in place by means of the rod 22, connected at its lower end to the bracket 23 and also connected at its upper end to the apertured lug 24, carried by said collar. It will, however, be obvious that the collar 21 may be threaded upon the nozzle 18, thus enabling said collar to be reliably and quickly adjusted and disposed in any preferred relation to the openings 19, thus insuring that the requisite quantity of air may be introduced into the nozzle 18 to be commingled with the gaseous product passing therethrough from the reservoir.

I desire to call special attention to the means I have provided for automatically preventing an undue pressure to accumulate within the receptacle 1, and thereby cause an explosion. The simple means I have provided for insuring that an excess of pressure will not be produced consists in this instance of the substantially vertically-disposed rod 25, which is pivotally connected in any preferred way to the bottom 6, as by the hook or staple 26, while the upper end thereof is conical in form and extends through an aperture provided in the top of the receptacle, and it is therefore obvious that since the bottom 6 is flexible and capable of moving downward upon undue pressure the said safety-rod 25 will be moved downward by reason of its connection with the bottom, and since the upper end thereof is conical in form an annular opening will be provided around the upper end of the rod, and thus permit the escape of the gas at this point and incidentally reduce the pressure within the reservoir to the safety-point.

In Fig. 4 I have illustrated a detail construction of the safety-rod 25, wherein it will be observed that the extreme end 27 thereof is conical or tapered. I have also provided the drip-cup 28, annularly disposed around the tubular throat 7, the object of said cup being to provide the initial means for heating said throat and the nozzle 18.

The simple appliance 9ª (illustrated in Fig. 3) will be found desirable for introducing and extracting the wick 9 from its seat and for other purposes.

The device illustrated in Fig. 5 comprises the members 29 and 30, pivotally connected together, the member 29 having the housing 31, designed to house or protect the pin 32 when the latter is not in use. Suitable notches or recesses 33 are also provided to enable the parts 29 and 30 to be easily opened or extended.

The entire instrument or device shown in Fig. 5 is designed to remove the charred end of the wick, inasmuch as the inner edges of the members 29 and 30 are sharpened like a pair of shears and may be used as such, while the point 32 is designed to loosen the charred end of the wick when it is desired to merely avoid trimming the same too closely.

Having fully described the construction and combination of parts deemed necessary in carrying out my invention, it is thought that the operation or manner of using the same will be fully apparent, though it may be stated that the annular cup-section 28 may be filled with gasolene or the like and ignited, which will insure that the throat 7 and nozzle 18 will become sufficiently heated to create a gas within the receptacle 1, when the valve may be opened by a proper rotation of the handle 15 and the gas at the end of the nozzle ignited and the collar 21 properly adjusted to insure that the desired degree of air will enter the openings 19 and become commingled with the gas, it being obvious that such commingling of the air and the gas is necessary in order to insure perfect combustion. Should the throat 7 become too greatly heated, the consequence would be that an undue quantity of gas would be accumulated within the reservoir, and the result would be that the bottom 6 would be forced by the pressure to move slightly downward and draw with it the safety-rod 25, insuring that an opening would be thus provided for the escape of the gas around the conical or tapered end 27 of said rod.

The various parts of my invention may be very cheaply and expeditiously manufactured of any desired or suitable material and easily assembled in their respective operative positions, and my improved lamp may be very advantageously used in or out of doors, since the flame is so strong that the wind cannot extinguish it.

My improved torch-lamp is useful for all of the many purposes to which such a lamp is ordinarily applied, as in laboratories, machine-shops, gas and water works, by plumbers and glaziers, tinkers in brass and other metals, wire-workers, instrument-makers, jewelers, and other similar uses where a very intense heat is required, as in burning off old paint, soldering, oxidizing, lead burning, tempering tools, &c.

Having thus fully described the construction and combination of parts involved in my invention and the manner of using the same, further reference to the details is deemed unnecessary.

What I claim as new, and desire to secure by Letters Patent, is—

The herein-described torch or lamp comprising a suitable reservoir provided with an inlet-orifice and a closure for said orifice; a flexible bottom section for said reservoir; a tubular throat and a valve coöperating with said throat; a flame-delivering nozzle having a plurality of air-inlets and means to regulate the size of said inlets, in combination with a safety-rod carried by said flexible bottom and having a tapered end adapted to extend through an aperture in the lid of the receptacle whereby when said flexible bottom is moved downward by undue pressure of the gas within the receptacle a vent will be provided for the escape of the gas, all combined substantially as specified and for the purpose set forth.

In testimony whereof I affix my signature in presence of two witnesses.

WILHELM WAHLBERG.

Witnesses:
  OTTO TEDQUIST,
  LEO J. SPAETGENS.